United States Patent [19]

Borman et al.

[11] Patent Number: 4,514,147
[45] Date of Patent: Apr. 30, 1985

[54] CONTROLLED VALVING FOR A DUAL PUMP SYSTEM

[75] Inventors: August H. Borman, Farmington; Erkki A. Koivunen, Livonia, both of Mich.

[73] Assignee: General Motors Corporation, Detroit, Mich.

[21] Appl. No.: 598,242

[22] Filed: Apr. 9, 1984

[51] Int. Cl.[3] ............................................. F04B 47/08
[52] U.S. Cl. .................................. 417/288; 417/428; 60/421
[58] Field of Search ............... 417/286, 287, 288, 302, 417/304, 428; 60/421, 422

[56] References Cited
U.S. PATENT DOCUMENTS 4,204,811  5/1980  Carter et al. .................... 417/428 X

FOREIGN PATENT DOCUMENTS 569300  5/1945  United Kingdom ................ 417/286

Primary Examiner—Richard E. Gluck
Attorney, Agent, or Firm—Donald F. Scherer

[57] ABSTRACT

The control valving for a dual pump hydraulic system has two regulator valves which control the distribution of pressurized fluid, on a priority basis, to a high pressure system, a low pressure system and a lube system. One regulator valve controls flow from both pumps to the high and low pressure systems. The other regulator valve controls flow from one pump to the lube system and bypasses excess flow from the other pump to the system reservoir. The first regulator valve satisfies the high pressure system requirements before any fluid is directed to the low pressure system. The other regulator valve receives fluid downstream of the first regulator valve and satisfies the low pressure system before any fluid is directed to the lube system or to the fluid return passage to the reservoir.

3 Claims, 1 Drawing Figure

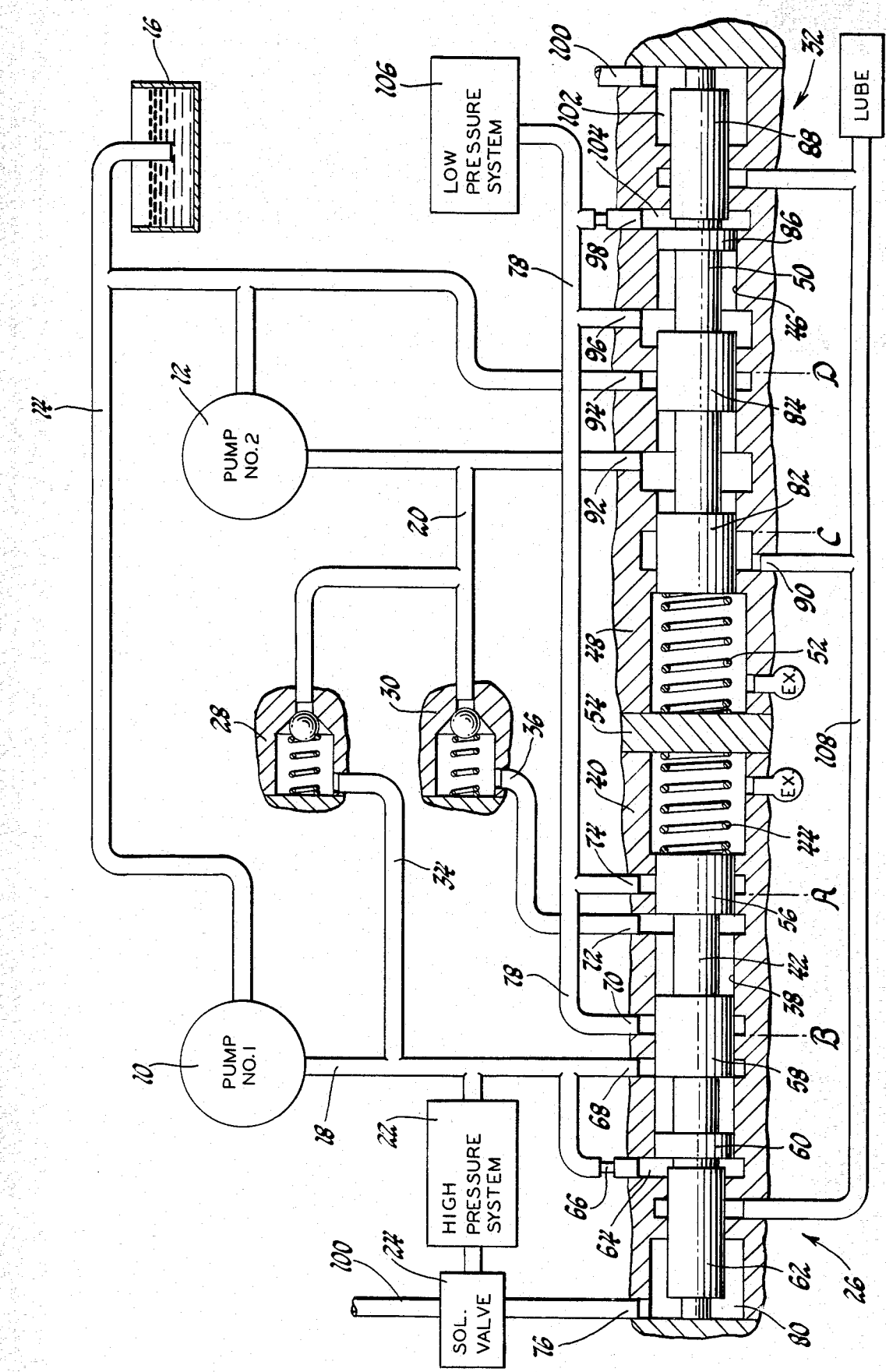

CONTROLLED VALVING FOR A DUAL PUMP SYSTEM

This invention relates to control valving and more particularly to a valve assembly for controlling the fluid distribution of a dual pump system.

It is an object of this invention to provide an improved control valving arrangement for a dual pump system wherein pressurized fluid is controlled to sequentially supply a high pressure system, a low pressure system and a lube system on a priority basis.

It is another object of this invention to provide an improved control valve arrangement for a dual pump system wherein two regulator valves are sequentially operated to control the fluid distribution to a high pressure system and a low pressure system, respectively, and wherein one of the regulator valves distributes fluid to a lube system after the low pressure system requirement is met.

It is a further object of this invention to provide a control valve structure for a dual pump system wherein two regulator valves are operated sequentially to connect the fluid supply by the pumps to a high pressure system, a low pressure system and a lube system with the fluid output of the pumps being sequentially distributed as follows: both pumps supply the high pressure system; one pump supplies fluid to each of the high pressure system and the low pressure system; one pump supplies fluid to the high pressure system and both pumps supply fluid to the low pressure system; and one pump supplies fluid to the high pressure and low pressure systems and the other pump supplies fluid to the lube system.

These and other objects and advantages of the present invention will be more apparent from the following description and drawing which is a diagrammatic representation of a fluid system incorporating the present invention.

Referring to the drawing, there is seen a first pump 10 and a second pump 12, both of which ingest fluid from an intake passage 14 which is connected to a reservoir 16. The pumps 10 and 12 may be of any of the conventional positive displacement pumps, such as vane type, gear type or piston type.

Pump 10 directs fluid under pressure to a pump discharge passage 18 while pump 12 delivers fluid under pressure to a pump discharge passage 20. The pump discharge passage 18 is connected to a high pressure system 22 which includes a solenoid control valve 24. The discharge passage 18 is also connected to a first regulator valve, designated 26.

Discharge passage 20 is connected to a pair of conventional check valves 28 and 30 and to a second regulator valve, designated 32. Check valve 28 is connected via passage 34 to passage 18 while check valve 30 is connected via passage 36 to the first regulator valve 26.

The first regulator valve 26 includes a stepped valve bore 38 formed in a valve body 40, a valve spool 42 slidably disposed in step bore 38 and a control spring 44. The second regulator valve 32 includes a stepped valving bore 46 formed in a valve body 48, a valve spool 50 and a control spring 52. The valve bodies 40 and 48 may be formed integrally as a single unit or as separate units which can be secured together by bolts or other commercially used fasteners, not shown. In any event, there is provision made for a separator plate or pin 54 which is disposed between the control springs 44 and 52 to provide a reaction surface for said springs.

Valve spool 42 has three equal diameter lands 56, 58 and 60, and a smaller diameter land 62 which are slidably disposed in respective portions of valve bore 38. The vave lands 60 and 62 cooperate to form a differential area which is in fluid communication with a pressure control chamber 64. The pressure chamber 64 is in fluid communication through a restriction 66 with the pump discharge passage 18. The valve bore 38 has a plurality of fluid connections, namely, an inlet port 68, an outlet port 70, an inlet port 72, an outlet port 74 and a control port 76. The inlet port 68 is connected with pump discharge passage 18 while the inlet port 72 is connected to passage 36. The outlet ports 70 and 74 are connected to the low pressure system passageway 78. The control port 76 is connected to the solenoid valve 24 which is operable to provide a variable control signal in a well-known manner. The control port 76 is also connected to a control chamber 80 in which fluid pressure will act on the end of valve land 62 to urge the valve spool rightward against control spring 44. This rightward urging of the valve spool 42 is additive to the rightward urging which will occur from fluid pressure in the pressure control chamber 64 which, as aforementioned, is connected to the discharge passage 18. The regulator valve 26 establishes the pressure level of the high pressure system 22.

The valve spool 50 has three equal diameter valve lands 82, 84 and 86 and a smaller diameter valve land 88 which are slidably disposed in respective portions of valve bore 46. The valve bore 46 includes a lube outlet port 90, an inlet port 92, a return port 94, a feed port 96, a regulating port 98 and a control port 100. The control port 100 is in fluid communication with the solenoid valve 24 and with a control chamber 102 in which fluid pressure operates on the right end of valve land 88 so as to urge valve spool 50 leftward against control spring 52. The valve lands 88 and 86 cooperate to provide a differential area which is in fluid communication with a pressure regulating chamber 104. Chamber 104 receives fluid pressure through port 98 from the low pressure system passage 78. The fluid pressure in the regulating chamber 104 urges the valve spool 50 leftward against regulating spring 52. The passage 78 is in fluid communication with a low pressure system 106. Regulator valve 32 establishes the pressure level of the low pressure system 106.

The lube outlet port 90 is connected to a lube supply passage 108 which delivers fluid to a lubricating system in the device to be controlled. The device to be controlled can be a continuously variable type transmission in which a variable belt drive requires a high pressure control system while clutch and brakes incorporated therewith utilize a low pressure system. These types of transmissions are well-known such that a more complete disclosure of such systems is not believed necessary at this time as those skilled in the art will be familiar with such systems. One such system can be seen in U.S. Pat. No. 4,402,237 issued to Tomlinson Sept. 6, 1983, and another such device is shown in U.S. Pat. No. 4,403,974 issued to Sherman et al Sept. 13, 1983.

In such devices, it is desirable to supply fluid to the high pressure system first thereby ensuring that proper belt tensions will be present. To accomplish this, the present system directs the entire fluid discharge of both pumps 10 and 12 to the high pressure system 22. Pump 10 is connected directly to the high pressure system 22 while pump 12 is connected through check valve 28 to the high pressure system 22. As the pressure level in the high pressure system 22 reaches the desired level, the fluid pressure in chambers 64 and 80 will urge the valve spool 42 rightward until the left edge of valve land 56 reaches position A. At this time, fluid output from pump 12 is directed from port 72 to port 74 which feeds passage 78 and the low pressure system 106. At this time, the pressure level of pump 12 will decrease and the pressure level of pump 10 will remain the same.

The pump 10 will supply the requirements of the high pressure system while pump 12 will begin to satisfy the low pressure system. When the high pressure system 22 is satisfied or otherwise does not need the full output of pump 10, valve spool 42 will move further rightward so that the left edge of land 58 will reach the position B thereby opening port 68 to port 70. The port 70 will supply fluid to passage 78 and the low pressure system 106. The valve spool 42 will seek the proper positioning so that the high pressure level of system 22 is maintained while the excess fluid from pump 10 is delivered to the low pressure system 106.

As the low pressure system 106 approaches the required pressure level, the valve spool 50 will move leftward against spring 52 until the right edge of valve land 82 reaches the position C at which time a portion of the discharge of pump 12 will be directed to passage 108 and the lubricating system. If the low pressure system is still receiving more fluid than desired, valve spool 50 will move further leftward so increasing amounts up to the total, of the discharge of pump 12 is delivered to the lube system while the discharge from pump 10 is divided between the high pressure system 22 and the low pressure system 106 depending upon the particular requirements of those systems.

The valve spool 50 will continue to move leftward, if the low pressure system 106 is receiving more fluid than necessary, until the right edge of land 84 reaches the position D at which time excess fluid delivered by pump 10 is directed from port 96 to port 94 which is connected to deliver fluid to reservoir 16 and the intake passage 14 of pumps 10 and 12.

The pressure levels established for the high pressure system 22 and low pressure system 106 are partially dependent on an external control pressure. The solenoid valve 24 which is preferably a pulse-width-modulated (PWM) valve, supplies this control pressure. As is well-known, such valves can establish a wide range of output pressure in response to electrical input signals. Thus, the control pressure in chambers 80 and 102 can be controlled either by a single PWM solenoid valve or a plurality of such valves. Response characteristics of the valves 26 and 32 is also controlled by the differential areas in chambers 64 and 104 as aforementioned. It is possible to use any of the well-known control valves, such as throttle controlled valves, to supply the control pressure in chambers 80 and 102.

As is well-known, the diameters of the lands on the valve spools 42 and 50 can be closely controlled thereby establishing the pressure response characteristics desired. By controlling the lands, the pressure requirements to reach the positions A through D can be closely controlled and varied in any particular control system. It should also be appreciated that spool 50 can reach position C before spool 42 reaches position B.

During the operation of the control system, if the pump 10 is supplying both the high and low pressure systems, and a sudden demand or increase flow requirement at the high pressure system occurs, the pressure in regulating chamber 64 will decrease permitting valve spool 42 to move leftward so that valve land 58 will close port 70. Simultaneously, the pressure in passage 78 will decrease so that the pressure in chamber 104 will permit valve spool 50 to move rightward thereby closing passage 94 and restricting fluid flow to passage 14. At this time, the pump 10 will supply the high pressure system 22 exclusively and pump 12 will supply the low pressure system and the lube system.

If the low pressure system is not satisfied, the valve spool 50 will continue to move rightward, increasing flow to the low pressure system, until the lube circuit is disconnected from pump 12 or the low pressure system is satisfied. If the high pressure system is not satisfied, the valve spool 42 will move further leftward to disconnect port 72 from port 74 such that the fluid discharge of pump 12 will be directed through check valve 28 to the high pressure system 22. Therefore, it is seen that high flow demands by the high pressure system will be accommodated first by either one or both pumps. Generally, such transient demands, if they occur, are of short duration so that no detrimental effects will occur at the low pressure system 106 or the lube system.

In a similar manner, instantaneous flow requirements of the low pressure system will be accommodated by rightward movement of valve spool 50 to first disconnect ports 94 and 96 and then disconnect ports 90 and 92, if necessary.

From the above description of operation, it will be appreciated that the valve system sequentially supplies fluid to the high pressure system, the low pressure system, and a lube system on a priority basis. Only when all three systems are satisfied is any of the pump fluid returned to the reservoir.

While the above system is described as utilizing positive fixed displacement pumps, positive variable displacement pumps will operate quite satisfactorily in such a system. Also, it will be obvious that a small displacement pump should be used as pump 10 to maintain the power input to the system at a minimum when the pump 12 is not supplying any high pressure oil.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. Hydraulic control for a dual pump hydraulic system wherein the pumps provide hydraulic fluid for a high pressure operating system, a low presure operating system and a lubricating system, one of said pumps being a relatively small displacement pump; said control comprising first regulator valve means including a control chamber, spring means, pressure regulator chamber means, a pair of low pressure outlet port means connected to the low pressure operating system and a pair of inlet port means connected with said small displacement pump and the other pump respectively; first check valve means connecting the output of the other pump to both the output of the small displacement pump and one of said inlet port means; second check valve means disposed between said other pump and the other of said inlet port means; second regulator valve means including an inlet port continuously connected to the outlet of said other pump, a lube pressure outlet port, a regulating chamber connected with the low pressure system, a return port connected to the inlet portions of both pumps, a control chamber, and spring means; and means for supplying control pressure to said control chambers on both said regulator valves for urging said regulator valves against the respective springs thereof, said first regulator valve responding to pressure in said high pressure system acting on said pressure regulator chamber means to sequentially connect said other pump through said second check valve means to said low pressure system and pass excess fluid from said small displacement pump to said low pressure system, and said second regulator valve responding to low pressure fluid operating in said regulating chamber to sequentially open said lube pressure outlet port to bypass fluid from said low pressure system to said lubricating system and open said return port to bypass the excess fluid in said low pressure system.

2. A hydraulic control for a dual pump hydraulic system wherein the pumps provide hydraulic fluid for a high pressure operating system, a low pressure operating system, and a lubricating system; said control comprising first regulator valve means including a valve spool, spring means operating on said valve spool, first pressure regulator chamber means operating on said valve spool, a pair of low pressure outlet port means connected to the low pressure operating system and a pair of inlet port means connected respectively with said pumps; first check valve means connecting the output of one of the pumps to both the output of the other pump and one of said inlet port means; second check valve means disposed between said one pump and the other of said inlet port means; second regulator valve means including an inlet port continuously connected to the outlet of said one pump, a lube pressure outlet port, second pressure regulating chamber means connected with the low pressure system, a return port connected to the inlet portions of both pumps, spool valve means operatively connected with the second regulating chamber means for controlling flow between the ports of the second regulator valve means, and spring means operating on said spool valve means, said first regulator valve responding to pressure in said high pressure system acting on said first regulator chamber means to sequentially connect said one pump through said second check valve means to said low pressure system, and then pass excess fluid from said other pump to said low pressure system, and said second regulator valve means responding to low pressure fluid operating in said second regulating chamber means to sequentially open said lube pressure outlet port to bypass fluid from said low pressure system to said lubricating system and then open said return port to bypass excess fluid from said low pressure system.

3. Hydraulic control for a dual pump hydraulic system wherein first and second pumps provide hydraulic fluid for a high pressure operating system, a low pressure operating system and a lubricating system, said control comprising first regulator valve means including a control chamber, spring means, pressure regulator chamber means, a pair of low pressure outlet port means connected to the low pressure operating system and a pair of continuously separated inlet port means connected with said first pump and said second pump respectively; first check valve means connecting the output of said second pump to both the output of said first pump and one of said inlet port means; second check valve means disposed between said second pump and the other of said inlet port means; second regulator valve means including an inlet port continuously connected to the outlet of said second pump, a lube pressure outlet port, a regulating chamber connected with the low pressure system, a return port connected to the inlet portions of both pumps, a control chamber, and spring means; and means for supplying control pressure to said control chambers on both said regulator valves for urging said regulator valves against the respective springs thereof, said first regulator valve responding to pressure in said high pressure system acting on said pressure regulator chamber means to sequentially connect said second pump through said second check valve means to said low pressure system and then pass excess fluid from said first pump to said low pressure system, and said second regulator valve responding to low pressure fluid operating in said regulating chamber to sequentially open said lube pressure outlet port to bypass fluid from said low pressure system to said lubricating system and then open said return port to bypass the escess fluid in said low pressure system.

* * * * *